United States Patent [19]
White et al.

[11] Patent Number: 5,293,621
[45] Date of Patent: Mar. 8, 1994

[54] VARYING WAIT INTERVAL RETRY APPARATUS AND METHOD FOR PREVENTING BUS LOCKOUT

[75] Inventors: Theodore C. White, Tustin; Jayesh V. Sheth, Mission Viejo; Paul B. Ricci; Dan T. Tran, both of Laguna Niguel, all of Calif.

[73] Assignee: Unisys Corporation, Blue Bell, Pa.

[21] Appl. No.: 2,566

[22] Filed: Jan. 11, 1993

[51] Int. Cl.$^5$ ............................................... G06F 13/42
[52] U.S. Cl. ............................... 395/650; 364/DIG. 1;
364/231.7; 364/240.1; 364/264.6
[58] Field of Search ................... 364/DIG. 1; 395/650

[56] References Cited

U.S. PATENT DOCUMENTS

4,096,571  6/1978  Vander Mey ................. 364/DIG. 1
4,410,889 10/1983  Bryant et al. ..................... 340/825.2

*Primary Examiner*—Thomas M. Heckler
*Attorney, Agent, or Firm*—Albert B. Cooper; Charles J. Fassbender; Mark T. Starr

[57] ABSTRACT

A User bus lockout prevention mechanism for use in a time-shared bus, multiple bus User, computer architecture where bus Users have private cache systems which perform a cache cycle when a WRITE TO MEMORY instruction occurs on the bus to determine if data cached from main memory has been overwritten in main memory. A User can be locked out from use of the bus if a synchronism occurs between repetitive cache cycles and periodicity of the request Retry mechanism of the User. Bus lockout is prevented by controlling the Retry mechanism of the User to retry requests in accordance with a sequence of varying retry wait intervals. The sequence comprises bursts of short wait intervals interleaved with long wait intervals, the sequence beginning with a burst of short wait intervals. The wait interval durations of the first and second occurring bursts are interleaved with respect to each other. The second occurring long wait is longer than the first occurring long wait. The sequence is terminated upon bus grant.

25 Claims, 5 Drawing Sheets

FIG. 5

VARYING WAIT INTERVAL RETRY APPARATUS AND METHOD FOR PREVENTING BUS LOCKOUT

CROSS-REFERENCE TO RELATED APPLICATION

Co-pending U.S. patent application Ser. No. 003,352; filed Jan. 12, 1992; entitled "Inhibit Write Apparatus And Method For Preventing Bus Lockout"; by Theodore C. White, et al.; assigned to the assignee of the present invention. Said Ser. No. 003,352 is incorporated herein by reference.

BACKGROUND OF THE INVENTION

1. Field of the Invention

The invention relates to time-shared bus computer architecture having bus Users with private cache storage, particularly with respect to bus access by Users during cache consistency procedures.

2. Description of the Prior Art

Present day digital computers often utilize a time-shared bus architecture including plural bus Users with one or more Users having a private cache. This architecture typically includes an I/O module User, one or more processor Users and a main memory User. An arbiter on the bus traditionally arbitrates the bus requests from the Users and the bus grants thereto. In operation, a User with a cache copies words from main memory into its cache and performs processes using the words in cache. For example, a processor User may copy program instructions and data from main memory to its cache and, thereafter, execute the program task from cache. As is appreciated, cache is used in this manner to enhance performance. The processor User with the cache avoids going back and forth on the bus to main memory for each instruction.

While a first User is performing processes with its cache, a second User may write to main memory in the locations copied by the first User into its private cache, rendering the cached words from the overwritten locations invalid. In order to maintain cache consistency, the first User monitors the bus and when a write to memory is detected from the second User, the first User executes a cache cycle to determine if it has data from the write-addressed main memory location. If so, the first User invalidates its cache so that the invalid data is not subsequently used. Typically, the execution time of a cache cycle occupies a significant number of bus cycles. Thus, while a cache cycle is executing, the second User, or a third User, can put another request on the bus to do another memory write while the first User is occupied with the original memory write.

In a particular design initially tried by the present inventors in the development of a computer system utilizing the above described architecture, the first User put a RETRY signal on the bus advising the second/third User to retry its memory write request at a later time and the second/third User included a Retry mechanism that retried the bus request at a fixed time interval after receiving the RETRY signal. Additionally, the User Retry mechanism included logic to establish a limit on the number of sequential retries that could be attempted before a decision was made that a malfunction had occurred. When such a malfunction was detected, the process was aborted and an error message generated.

The present inventors discovered that, although a User may indicate a Retry-Limit-Exceeded error condition, the condition was not caused by a malfunction. Instead, a rarely occurring synchronism between repetitive WRITES TO MEMORY by a first bus User, the concomitant cache cycles of a second bus User and the Retry mechanism in a third bus User, resulted in the apparent "failure" of the third bus User. The third bus User was forced to retry its bus operation beyond its Retry Limit. This failure mechanism, herein denoted as bus lockout, will be described later in greater detail.

The occurrence of bus lockout may be exacerbated since the sending of the RETRY signal is repeated when numerous bus Users attempt WRITES TO MEMORY via the bus during a cache cycle. Furthermore, each of numerous bus Users can have a cache, thus causing numerous RETRY signals to be sent.

In the non-analogous technology of Local Area Networks (LAN), communication users on the LAN retry transmissions using a randomly selected Retry wait interval. Such a system is described in U.S. Pat. No. 4,410,889, issued Oct. 18, 1983. It is appreciated that the random Retry wait interval is unsuitable for use in the computer architecture described above. A randomly selected Retry wait interval can be unacceptably long, seriously degrading the performance of the User.

SUMMARY OF THE INVENTION

The present invention resolves the bus lockout problem by utilizing a request Retry sequence with varying wait intervals where at least the first wait interval is a short time interval. Generally, the sequence will include at least two adjacent wait intervals that are different with respect to each other.

In the preferred embodiment, the sequence is comprised of bursts of short wait intervals separated by long wait intervals. Preferably, adjacent short intervals in a burst are different with respect to each other and the burst pattern of a particular burst is different from the burst pattern of the preceding burst. Additionally, the wait interval of a particular long wait is different from the wait interval of the preceding long wait.

More specifically, the first two bursts of the sequence comprise monotonically increasing short wait intervals with the lengths of the intervals of the second burst interleaved with the lengths of the intervals of the first burst. Preferably, the wait interval of the second long wait is longer than the wait interval of the first long wait.

Subsequent bursts of short wait intervals interleaved with long intervals can repeat the pattern of the first two bursts, but using different short and long intervals. Alternatively, the short wait intervals of the subsequent bursts as well as the intermediate long wait intervals can be arranged in a quasi-random manner.

DESCRIPTION OF THE PREFERRED EMBODIMENT

Figure 1:
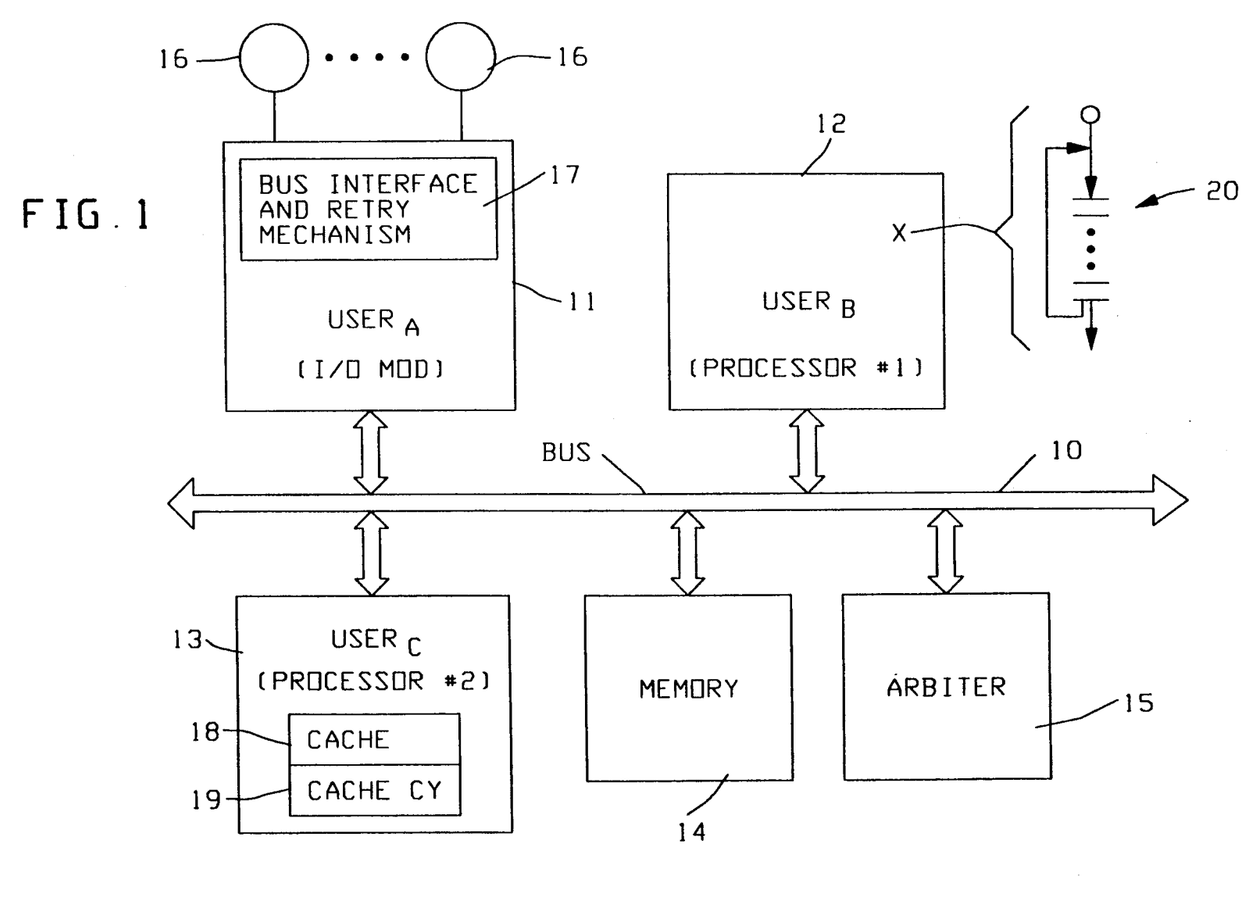
FIG. 1 is a schematic block diagram illustrating a time-shared bus computer architecture in which bus lockout can occur.

Referring to FIG. 1, a computer system is illustrated utilizing a bus 10 time-shared among bus Users 11, 12 and 13; denoted as User$_A$, User$_B$ and User$_C$, respectively. A main memory 14 and a bus arbiter 15 are also coupled to the bus 10. The arbiter 15 controls the access to the bus of the Users 11-13 via bus grants thereto in response to bus requests therefrom.

The User 11 may, for example, be an Input/Output module coupling peripherals 16 into the system. The peripherals 16 may include disk, tape, printer, and the like. User 11 includes a conventional Retry mechanism 17. The Retry mechanism 17, after a certain fixed time interval $T_{WAIT}$, retries a bus request issued by the User 11 in response to a RETRY signal on the bus 10. The Retry mechanism 17 includes the conventional user bus request and grant mechanisms that interface with the bus 10. It is appreciated that Users 12 and 13 also include similar Retry mechanisms.

The memory 14 is the main memory of the illustrated computer system and stores the user software instructions and data for the operations to be performed by the computer system.

The bus Users 12 and 13 may, for example, comprise two microprocessors for concurrent execution of programs. User 13 is illustrated as including a cache memory system 18. The cache 18 includes a fast memory for storing instructions and data read from the main memory 14 by the User 13, so that the User 13 can operate thereupon without requiring numerous accesses to the bus 10 and the main memory 14. As is appreciated, a significant enhancement in performance is achieved by this arrangement. The cache 18 also includes a cache cycle control mechanism 19 to be later described. It is appreciated that each of the other Users on the bus 10 can also include a cache memory system similar to the cache 18.

The bus 10 is a conventional time-shared bus having data lines to transmit data, request lines for the Users 11-13 to acquire the bus, and a grant line granting a User access to the bus. The arbiter 15, in response to the User bus requests, controls the bus grants and implements a priority system for resolving bus contention when two or more Users simultaneously request access to the bus. The arbiter 15 preferably utilizes a priority assignment protocol that tends to grant equal bus access to all the bus Users.

As schematically indicated, the User 12 may be executing a program that has a loop 20 with the computer instructions of the loop represented by the horizontal lines. One of the computer instructions may be the WRITE TO MEMORY. The loop 20, of length $T_{LOOP}$, may be executed thousands of times and the program may include thousands of such loops of different lengths. Execution of a loop of this type in conjunction with the operation of the Retry mechanism 17 results in the User 11 experiencing bus lockout in a manner to be described.

As discussed above, invalid data in the cache 18 would result if another User, such as User 11, would write data into locations in the memory 14 from which the User 13 had cached data. The conventional approach to prevent this invalid data, is the performance of the cache cycle. The User 13 monitors the bus 10 for writes to the memory 14 and when a WRITE TO MEMORY instruction is detected, the cache cycle control mechanism 19 is invoked. The control mechanism 19 checks the cache 18 to determine if it is storing data from the memory location that the WRITE TO MEMORY addressed. Typically, the cache cycle spans numerous bus cycles. Thus, while the cache cycle control mechanism 19 is performing the cache cycle, the User 13 may detect a bus request for a WRITE TO MEMORY from, for example, the User 11. In response to this request, the User 13 issues a RETRY onto the bus 10 because the cache cycle control mechanism is busy doing a cache cycle. In response to the RETRY signal, the User 11 invokes the Retry mechanism 17 and then proceeds to perform some other task. The Retry mechanism 17 is designed to retry the request after a fixed time interval, $T_{WAIT}$, has elapsed. When the cache cycle control mechanism 19 detects invalid data because the location in memory 14 from which the data was copied has been overwritten, the User 13 marks that data in the cache as being invalid. At a later time, when the User 13 wishes to use the data, it accesses the main memory 14 to update the cache 18 with the new information.

Figure 2:
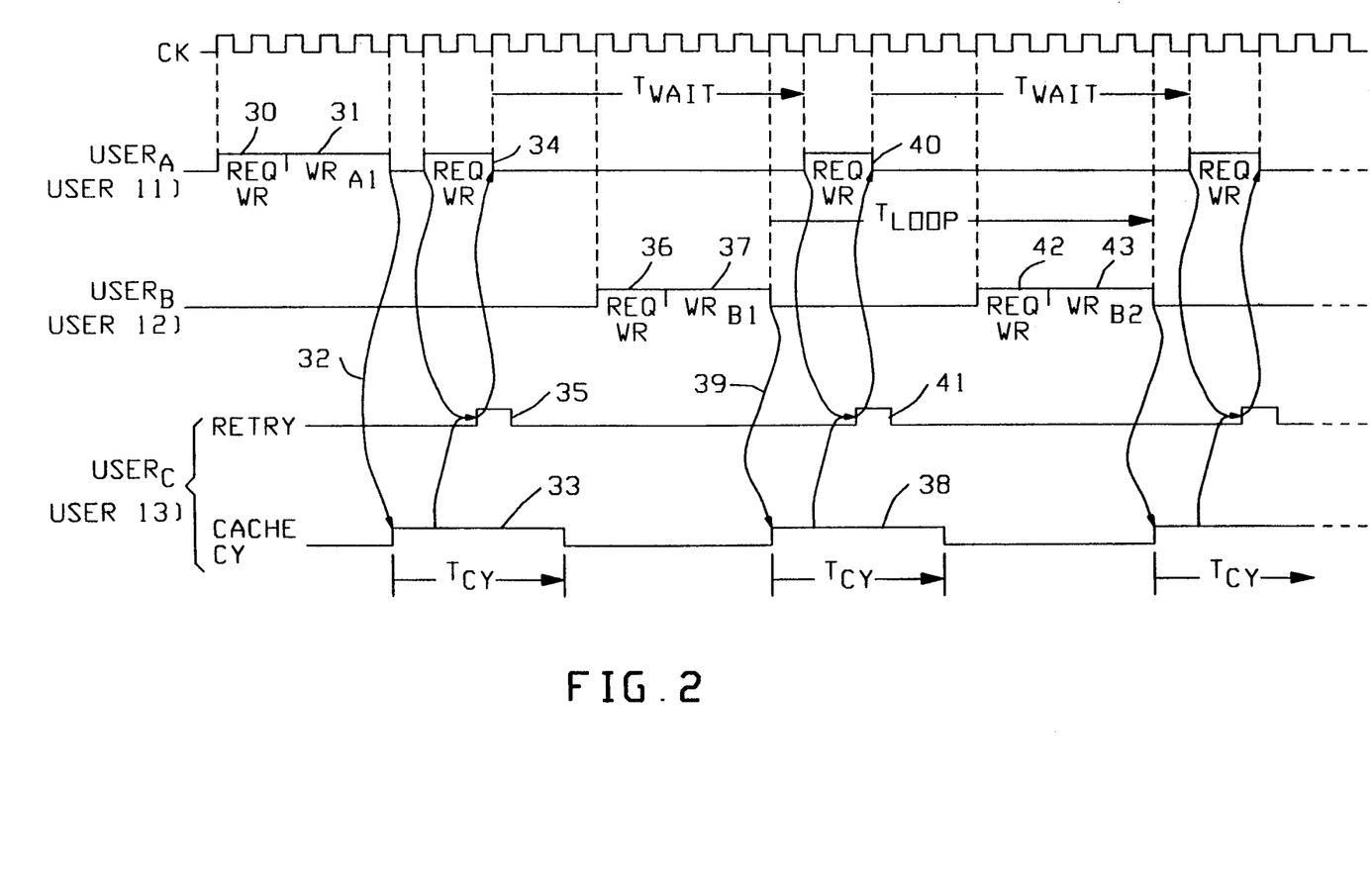
FIG. 2 is a waveform timing diagram illustrating the bus lockout problem.

As discussed above, a rarely occurring synchronism between the operation of the Retry mechanism 17 and the execution of the loop 20 can result in bus lockout with respect to the User 11. This phenomenon is illustrated in FIG. 2. Referring to FIG. 2, with continued reference to FIG. 1, the first line illustrates the system clock (CK) which is a signal on the bus 10. All occurrences on the bus 10 are in synchronism with CK. The second and third lines of FIG. 2 illustrate the operations performed by Users 11 and 12, respectively, and the last two lines of FIG. 2 illustrate the operations performed by User 13.

As illustrated, User 11 issues a request 30 to do a WRITE TO MEMORY, obtains the bus 10 and executes the WRITE TO MEMORY 31. The nomenclature $WR_{A1}$ denotes that User 11 (User$_A$) executes the first WRITE TO MEMORY. As indicated by arrow 32, User %3 executes a cache cycle 33 in response to the WRITE TO MEMORY 31. The cache cycle 33 is illustrated as being performed in a time interval $T_{CY}$.

Following the WRITE TO MEMORY 31, the User 11 issues a second request 34 for another WRITE TO MEMORY. In the embodiment exemplified in FIG. 1, User 11 is an I/O module that may be receiving data from disk and attempting to stream the information into memory 14. This write request 34, however, occurs when User 13 is busy executing cache cycle 33. Consequently, User 13 informs user 11 to retry the write request 34 by issuing a RETRY signal 35 onto the bus 10. User 11 receives the RETRY signal 35 and, in response thereto, invokes the Retry mechanism 17 (FIG. 1) having the Retry interval $T_{WAIT}$. Thus, the User 11 does not perform the write operation pursuant to the request 34, but instead may perform some other task or simply do nothing before returning after $T_{WAIT}$, again to issue the bus request for the write.

Meanwhile, the cache cycle 33 completes in User 13 and User 12 coincidentally issues a request 36 for a WRITE TO MEMORY. Since the user 13 has completed the cache cycle 33, the bus is granted to the User 12 to perform WRITE TO MEMORY 37 pursuant to the request 36. The write 37 is denoted as $WR_{B1}$ or the first write for User 12 (User$_B$). The WRITE TO MEMORY 37 initiates another cache cycle 38 in User 13, as indicated by arrow 39. In accordance with the Retry mechanism 17, User 11 returns with request 40 to perform the previous write, but again User 13 is busy with cache cycle 38. As before, User 13 broadcasts RETRY signal 41, again causing User 11 to invoke the Retry mechanism 17. This sequence continues with User 12 again intervening with request 42 and write 43 which again denies the bus to User 11. Should this sequence continue for a long period of time, the User 11 is effectively locked out from use of the bus; and that can cause an apparent system malfunction.

As discussed above with respect to FIG. 1, the bus lockout of User 11 may result from a synchronism between the execution of the loop 20 and the operation of the Retry mechanism 17. It is appreciated from FIG. 2, that if the WRITES TO MEMORY 37, 43, etc. of User 12 are regularly occurring with periodicity $T_{LOOP}$, as part of the execution of the loop 20, and the bus requests 34, 40, etc. of User 11 are periodically occurring with periodicity $T_{WAIT}$, because of the operation of the Retry mechanism 17, the User 11 can become locked out from use of the bus 10 for an unacceptably long period of time.

It is appreciated that such synchronism will be a rarely occurring phenomenon. User 12 may be executing thousands of loops containing the WRITE TO MEMORY instruction, the loops being of different and arbitrary lengths. Most of the loops will be of the wrong length to result in such synchronism. There may, however, be one loop of precisely the appropriate length to result in the bus lockout situation.

Other phenomena may also cause the bus lockout condition to occur. For example, the Input/Output module 11 may be streaming data into the memory 14 utilizing a long string of regularly occurring WRITES TO MEMORY. Another User may have regularly occurring bus requests so synchronized with the operation of the Input/Output module 11 as to be locked off the bus. Such regularly occurring requests may result from the Retry mechanism of the other User.

Figure 3:
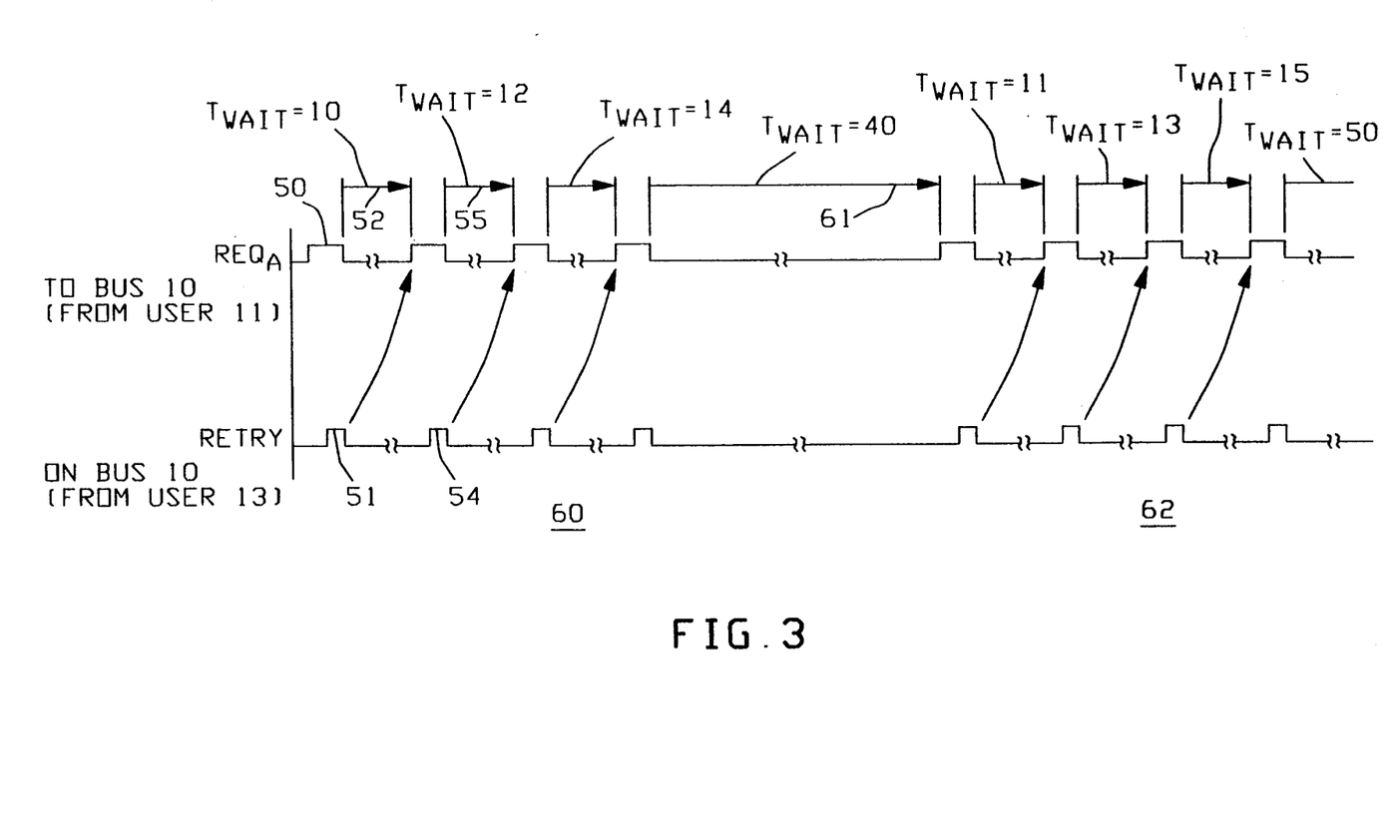
FIG. 3 is a waveform timing diagram illustrating operation in accordance with the invention.

Referring to FIG. 3, with continued reference to FIG. 1, operation of the FIG. 1 system pursuant to the invention is illustrated. In accordance with the invention, the bus interface and Retry mechanism 17 is operated such that the Retry wait interval, $T_{WAIT}$, is varied in a particular fashion so as to desynchronize operation of a mechanism, such as the loop 20 and the operation of the Retry mechanism 17; and at the same time, to maintain system performance. A request Retry sequence, in accordance with the invention, is illustrated. The top line, denoted as $REQ_A$, illustrates the requests to use the bus placed by User 11 ($User_A$) on the bus 10. The second line illustrates the RETRY signals placed on the bus 10 by, for example, User 13, the User with the cache. The request signals, $REQ_A$, occur in response to the RETRY signals and illustrate the preferred sequence of variations in the Retry time interval, $T_{WAIT}$, to effect the desynchronization.

In operation, User 11 issues a bus request 50 and is retried as indicated by RETRY signal 51 In response to the RETRY signal 51, User 11 removes the bus request and waits for a short Retry interval 52 to reassert the request as indicated at 53. The wait interval 52 may, for example, comprise 10 units of time. In response to the request 53, the User 11 is again retried as indicated by RETRY signal 54. Again, User 11 drops the request and then waits another short period of time 55 before raising the next request 56. The wait interval 55 is different from the wait interval 52 and comprises, for example, 12 time units. In the absence of bus grant, the sequence continues with a third short wait interval of, for example, 14 time units. The illustrated sequence of short time interval retries may be denoted as a short time interval burst 60.

Following the burst 60, the sequence continues with a long wait interval 61. The long wait interval 61 may, for example, comprise 40 time units. The sequence then continues after the time interval 61 with a second burst 62 of short Retry wait intervals. The burst 62 is structured in a manner similar to that of the burst 60, except that wait intervals 11, 13 and 15 time units are utilized instead of the wait intervals 10, 12 and 14 time units, respectively, of the burst 60. After the burst 62, the sequence continues with a second long wait interval, which may, for example, comprise 50 time units. The time units of the $T_{WAIT}$ intervals of FIG. 3 are, for example, system clock cycles. The sequence continues over and over in a similar manner with each burst of short wait intervals followed by a long wait interval. The sequence is terminated if the bus is granted in response to one of the requests. The sequence is also terminated if, after a large predetermined number, RMAX, of sequential unsuccessful requests, grant of the bus is not obtained.

In one embodiment, the sequence of FIG. 3 is continued by further repetitions of the wait intervals 60, 61 and 62 exactly as illustrated. Alternatively, the long wait intervals can be further increased or otherwise varied. Other short wait patterns can also be utilized in the sequence, such as 16, 18, 20 time units followed by 17, 19, 21 time units. Additionally, although each burst 60 and 62 illustrates three retries, it is appreciated that additional retries may be included in the burst.

Although the sequence illustrated in FIG. 3 utilizes monotonically increasing the short wait intervals in each burst, it is appreciated that both increasing and decreasing the short wait interval durations can be utilized in the burst. A further preferred embodiment may be effected by quasi-randomly scrambling the short wait intervals.

It is appreciated that the sequence of $T_{WAIT}$ time intervals of FIG. 3 is constructed to have a quasi-random character. The rationale behind the quasi-random structure of the pattern of the Retry wait interval sequence is as follows. During normal operation of the above described computer system, one retry prior to bus grant usually occurs in response to a bus request. Two successive retries prior to bus grant occur substantially less frequently. Three successive retries prior to grant occur very seldom and four successive retries prior to grant are almost non-existent. Such Retry statistics result from such normal system operating conditions as momentary unavailability of, or momentary contention for, system resources and components. For example, an input buffer may momentarily be full or a desired memory location may be in the process of otherwise being accessed. In addition to the normal conditions described, abnormal conditions, such as the bus lockout synchronization described above with respect to the loop 20 of FIG. 1, may also occur.

It is desired that, for performance, a User obtain the bus as fast as possible. In the preferred embodiment of the invention, the short time interval burst, such as the burst 60, includes from two to ten retries. This range of retries is sufficient to provide bus grant for normally occurring system operations. Thus, during such normal operation, bus grant will be achieved during the short wait interval burst 60 and a performance penalty will not be suffered by introduction of a long wait interval, such as the interval 61. Even if the failure to obtain the bus is caused by the bus lockout synchronization described above, the variations in the time intervals within the short time interval burst 60 is normally sufficient to desynchronize the condition and obtain bus grant without losing performance.

For rarely occurring situations where the time interval variations of the short wait interval burst is insufficient to achieve desynchronization, the long wait interval is included to provide further time interval variation and randomness in the overall pattern. The first long wait interval 61 is utilized to permit the User that is causing the lockout to complete the synchronizing operation or to enter a different portion of its operation where there is no longer a synchronizing condition. After the long retry interval, another burst of short intervals is utilized for performance reasons and to determine if the synchronized lockout condition is still in effect.

At each request of the sequence, the probability of again being retried decreases and eventually the probability of being retried goes to zero. Therefore, there is an eventual end of retry count that indicates that if bus grant has not been achieved, a malfunction has occurred. This count is, in the preferred embodiment, at least 256. A large count is preferred that results in a time interval of approximately one-half second of successive unsuccessful retries.

In summary with respect to FIGS. 1 and 3, the User 11 varies the time interval between retried requests to use the bus so as to desynchronize the synchronous bus lockout condition with respect to Users 12 and 13. The initial $T_{WAIT}$ intervals are short so as not to degrade performance of the User 11. After the burst 60, one long wait 61 is utilized to increase the randomization of the overall $T_{WAIT}$ time pattern.

In the preferred embodiment of the invention, $T_{WAIT}$ for a short wait interval is in the range of approximately 5-20 system clock cycles. This range is appropriate in the preferred embodiment to permit normally occurring momentary conditions that cause bus request retry to terminate so that bus grant is achieved within one or two retries of the initial short wait interval burst 60. In the preferred embodiment of the invention, the long interval $T_{WAIT}$ is in the range of 21-100 system clock cycles.

The sequence of FIG. 3 is contrasted to a simple random sequence. The synchronization causing bus lockout is a rare occurrence and therefore the initial request Retry intervals are maintained short so that the User can get on the bus as soon as possible. In a purely random sequence, the initial wait on the first retry may be very long, which would seriously degrade the performance of the User.

Figure 4:
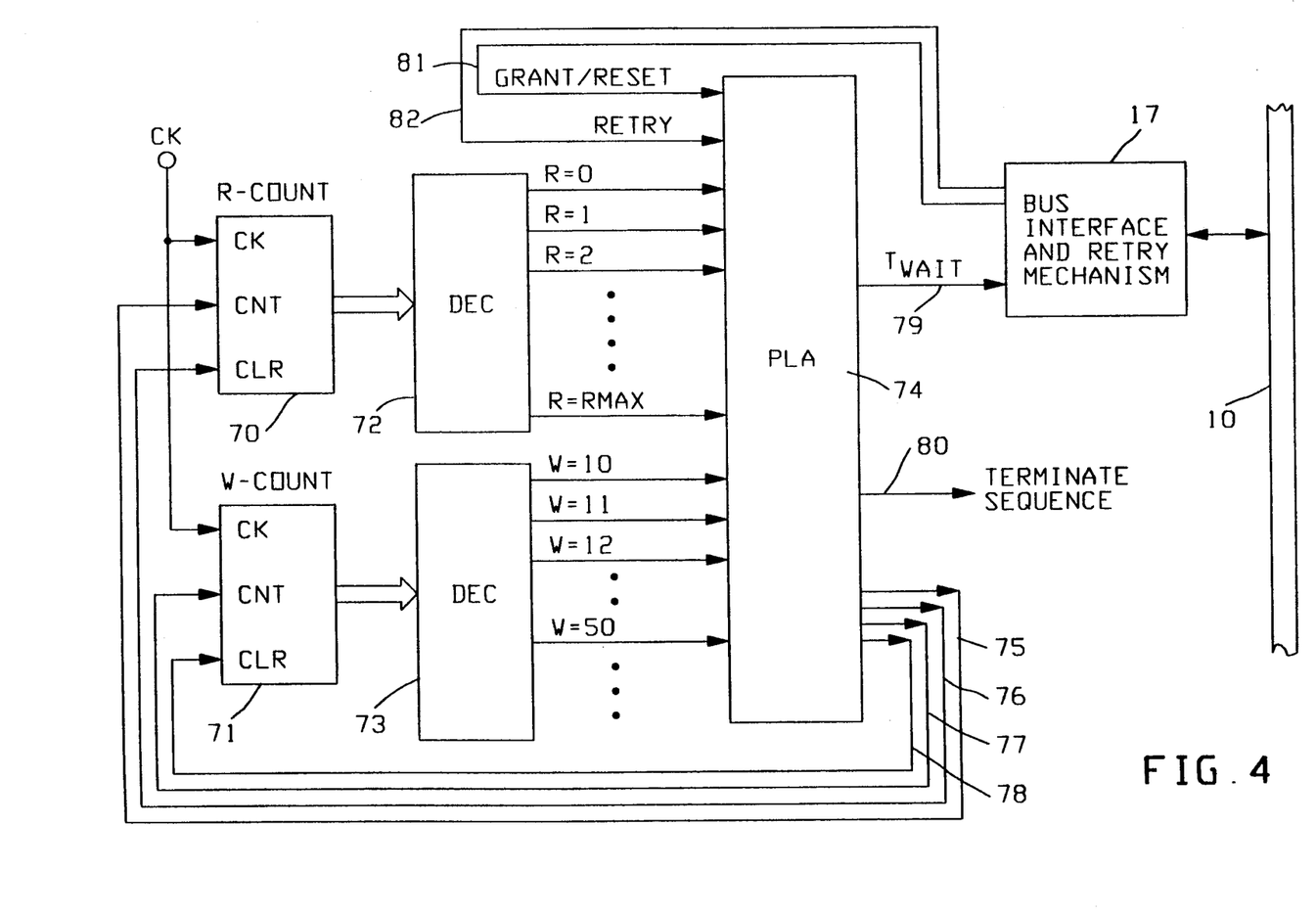
FIG. 4 is a schematic block diagram illustrating preferred apparatus for practicing the invention.

Referring to FIG. 4, a circuit for generating the request Retry wait interval sequence of FIG. 3 is illustrated. The circuitry of FIG. 4 is included in each bus User. The circuitry includes an R-counter 70 (Retry counter) and a W-counter 71 (Wait counter) which are clocked from the system clock CK. The R-counter 70 counts the number of retries for a request and the W-counter 71 counts the request Retry interval, $T_{WAIT}$, which is the time to wait for the request to be retried. The outputs of the counters 70 and 71 are applied as inputs to decoders 72 and 73, respectively, and the outputs of the decoders 72 and 73 are applied as inputs to a programmable logic array (PLA) 74. The decoder 72 provides a discrete output for each of the request retries of the sequence of FIG. 3 up to RMAX. The decoder 73 provides a discrete output for each of the wait intervals, $T_{WAIT}$, utilized in the sequence of FIG. 3. The PLA 74 provides feedback lines 75 and 76 as control inputs to the counter 70 and feedback lines 77 and 78 as control inputs to the counter 71. The feedback line 75 enables the counter 70 to count upwardly in response to the clock CK and the feedback line 76 clears the counter 70 to zero. The feedback lines 77 and 78 perform the same respective functions with respect to the counter 71.

The PLA 74 provides a signal, $T_{WAIT}$, on an output 79 to the bus interface and Retry mechanism 17. The signal on the output 79 controls the Retry mechanism 17 to retry the request in accordance with the particular wait interval of the sequence of FIG. 3. The PLA 74 also provides an output 80 to terminate the request Retry sequence when R=RMAX.

The PLA 74 receives the bus grant signal and the RETRY signal at inputs 81 and 82, respectively. The PLA 74 also receives a Reset signal at the input 81. The grant signals, RETRY signal and Reset signal are provided to the PLA 74 from the bus 10 through the bus interface and Retry mechanism 17. The grant signal is issued to the User containing the apparatus of FIG. 4 when the User is granted the bus. The RETRY signal, as illustrated in FIG. 3, is issued to instruct the User to retry a bus request. The Reset signal is issued on the bus 10 when the computer is initialized, for example, at turn-on.

In response to both the Reset signal and the grant signal applied to the input 81, the PLA 74 clears the counters 70 and 71 to zero via the feedback lines 76 and 78. In response to the RETRY signal at the input 82 and the existing R-count from the decoder 72, the PLA 74 controls the counter 71, via the feedback line 77 to count out the appropriate $T_{WAIT}$ interval. Additionally, in response to the RETRY signal at the input 82, the PLA 74 controls the counter 70, via the feedback line 75, to increase the R-count by one. The PLA 74 is programmed with conventional logic to perform the above described functions.

Thus, it is appreciated that the apparatus of FIG. 4, in response to successive RETRY signals, executes the sequence of FIG. 3 until terminated and reset by a grant signal at the input 81 or attaining the Retry count of RMAX. Although specific logic is illustrated in FIG. 4 to perform the described functions, it is appreciated that equivalent hardware or software can be utilized to the same effect. A state machine responsive to the clock CK could also be utilized to perform the functions of the PLA 74.

Figure 5:
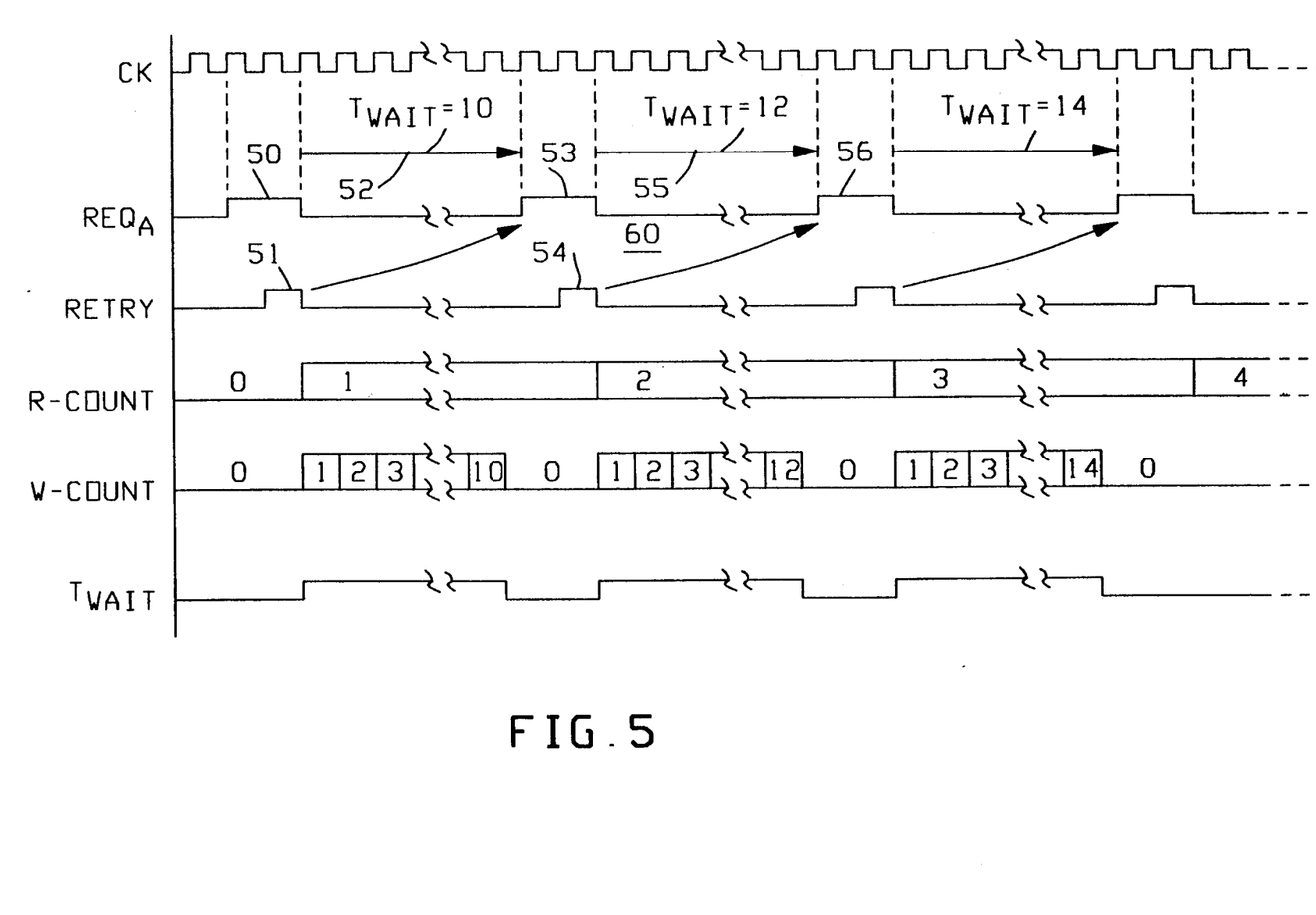
FIG. 5 is a waveform timing diagram illustrating operation of the apparatus of FIG. 4.

Referring to FIG. 5, with continued reference to FIGS. 3 and 4, signals existing during the operation of FIG. 4 are illustrated. The upper line of FIG. 5 illustrates the system clock CK. The second and third lines of FIG. 5 are identical to the burst 60 of FIG. 3 and like reference numerals indicate like elements with respect thereto. The fourth line of FIG. 5 illustrates the R-count of counter 70 as it counts the successive retries. The fifth line of FIG. 5 illustrates the W-count of counter 71 as it counts out the appropriate wait intervals. The last line of FIG. 5 illustrates the $T_{WAIT}$ signal on the output 79 of the PLA 74.

With respect to the specific embodiment as depicted in FIG. 1, the $REQ_A$ signal illustrates the requests that User 11 is issuing to the bus 10 and RETRY illustrates the RETRY signal generated by User 13 and issued on the bus 10 for User 11. The R-count, W-count and $T_{WAIT}$ signals are internal to User 11.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. In a computer system having a time-shared bus with a plurality of bus Users coupled to said bus, said plurality of bus Users including a first bus User operative to issue a bus request to said bus to use said bus and to receive a RETRY signal from said bus to retry said bus request, bus lockout prevention apparatus comprising wait interval control means, in said first User, responsive to successive occurrences of said RETRY signal for generating a corresponding sequence of request retry wait intervals, said sequence beginning with a first burst of successive short wait intervals followed by a first long wait interval, at least two successive short wait intervals of said first burst being different with respect to each other, said long wait interval being long relative to said short wait intervals of said first burst, and request retry means in said first User for issuing successive bus requests to said bus in response to said successive occurrences of said RETRY signal after respective controllable wait intervals controlled by said sequence, said wait interval control means being operative to terminate said sequence when said bus is granted to said first user in response to one of said bus requests.

2. The apparatus of claim 1 wherein said wait interval control means is operative to generate said sequence as bursts of successive short wait intervals, said bursts being separated by long wait intervals, said long wait intervals being long relative to said short wait intervals, said first burst being a first occurring burst in said sequence, a next occurring burst comprising a second burst, said first and second bursts being separated by said first long wait interval, said short wait intervals of said bursts and said long wait intervals having respective durations, said durations of said second burst being different from said durations of said first burst.

3. The apparatus of claim 2 wherein said wait interval control means is operative to generate said sequence with each said burst having successive short wait intervals that are different with respect to each other.

4. The apparatus of claim 3 wherein said wait interval control means is operative to generate said sequence with said first long wait interval being a first occurring long wait interval and a successively occurring long wait interval being a second long wait interval, said durations of said first and second long wait intervals being different with respect to each other.

5. The apparatus of claim 4 wherein said duration of said second long wait interval is longer than said duration of said first long wait interval.

6. The apparatus of claim 5 wherein said wait interval control means is operative to generate said sequence with said second long wait interval occurring after said second burst; said successive short wait intervals of said first burst comprising 10, 12 and 14 time units, respectively; said successive short wait intervals of said second burst comprising 11, 13 and 15 time units, respectively; said first and second long wait intervals comprising 40 and 50 time units, respectively.

7. The apparatus of claim 5 wherein said computer system operates under control of a system clock signal having system clock cycles and said wait interval control means is operative to generate said sequence with said second long wait interval occurring after said second burst, with each said short wait interval being in the range of 5-20 of said system clock cycles, and with each said long wait interval being in the range of 21-100 of said system clock cycles.

8. The apparatus of claim 3 wherein said wait interval control means is operative to generate said sequence so that said successive short wait intervals of said first and second bursts have increasing durations.

9. The apparatus of claim 8 wherein said wait interval control means is further operative to generate said first and second bursts with said durations of said short wait intervals of said second burst interleaved with said durations of said short wait intervals of said first burst.

10. The apparatus of claim 3 wherein said wait interval control means is operative to generate said sequence with said durations being arranged in a quasi-random manner.

11. The apparatus of claim 3 wherein said wait interval control means is operative to generate said sequence with each said burst including a number of said successive short wait intervals in the range of 2-10.

12. The apparatus of claim 1 wherein said sequence of request retry wait intervals comprises successively occurring wait intervals with respective wait interval durations, said wait interval control means comprising first counter means for counting said successive occurrences of said RETRY signal, thereby providing a retry count signal, second counter means for timing said durations of said successive wait intervals, thereby providing a wait count signal, and logic means responsive to said retry count signal, said wait count signal and said RETRY signal and coupled to control said first and second counter means so as to generate said sequence in response to said retry count signal, said wait count signal and said retry signal.

13. The apparatus of claim 12 wherein said logic means is operative, in response to a grant signal, to terminate said sequence when said bus is granted to said first User, said logic means being further operative to reset said first and second counter means in response to said grant signal.

14. The apparatus of claim 12 wherein said logic means comprises a programmable logic array.

15. In a computer system having a time-shared bus with a plurality of bus Users coupled to said bus, said plurality of bus Users including a first bus User operative to issue a bus request to said bus to use said bus and to receive a RETRY signal from said bus to retry said bus request, a bus lockout prevention method comprising generating, responsive to successive occurrences of said RETRY signal, a corresponding sequence of request retry wait intervals, said sequence beginning with a first burst of successive short wait intervals followed by a first long wait interval, at least two successive short wait intervals of said first burst being different with respect to each other, said long wait interval being long relative to said short wait intervals of said first burst, issuing successive bus requests to said bus in response to said successive occurrences of said RETRY signal after respective controllable wait intervals controlled by said sequence, and terminating said sequence when said bus is granted to said first user in response to one of said bus requests.

16. The method of claim 15 wherein said generating step comprises generating said sequence as bursts of successive short wait intervals, said bursts being separated by long wait intervals, said long wait intervals being long relative to said short wait intervals, said first burst being a first occurring burst in said sequence, a next occurring burst comprising a second burst, said first and second bursts being separated by said first long wait interval, said short wait intervals of said bursts and said long wait intervals having respective durations, said durations of said second burst being different from said durations of said first burst.

17. The method of claim 16 wherein said generating step comprises generating said sequence with each said burst having successive short wait intervals that are different with respect to each other.

18. The method of claim 17 wherein said generating step further comprises generating said sequence with said first long wait interval being a first occurring long wait interval and a successively occurring long wait interval being a second long wait interval, said durations of said first and second long wait intervals being different with respect to each other.

19. The method of claim 18 wherein said generating step further comprises generating said sequence so that said duration of said second long wait interval is longer than said duration of said first long wait interval.

20. The method of claim 19 wherein said generating step comprises generating said sequence with said second long wait interval occurring after said second burst; said successive short wait intervals of said first burst comprising 10, 12 and 14 time units, respectively; said successive short wait intervals of said second burst comprising 11, 13 and 15 time units, respectively; said first and second long wait intervals comprising 40 and 50 time units, respectively.

21. The method of claim 19 wherein said computer system operates under control of a system clock signal having system clock cycles and said generating step comprises generating said sequence with said second long wait interval occurring after said second burst, with each said short wait interval being in the range of 5-20 of said system clock cycles, and with each said long wait interval being in the range of 21-100 of said system clock cycles.

22. The method of claim 17 wherein said generating step further comprises generating said sequence so that said successive short wait intervals of said first and second bursts have increasing durations.

23. The method of claim 22 wherein said generating step further comprises generating said first and second bursts with said durations of said short wait intervals of said second burst interleaved with said durations of said short wait intervals of said first burst.

24. The method of claim 17 wherein said wait interval control means is operative to generate said sequence with said durations being arranged in a quasi-random manner.

25. The method of claim 17 wherein said generating step comprises generating said sequence with each said burst including a number of said successive short wait intervals in the range of 2-10.

* * * * *